United States Patent [19]

Bonacci et al.

[11] 4,292,167

[45] Sep. 29, 1981

[54] NOBLE METAL REFORMING OF NAPHTHA

[75] Inventors: John C. Bonacci, Murray Hill; John R. Patterson, Haddonfield, both of N.J.

[73] Assignee: Mobil Oil Corporation, New York, N.Y.

[21] Appl. No.: 111,743

[22] Filed: Jan. 14, 1980

Related U.S. Application Data

[63] Continuation-in-part of Ser. No. 53,582, Jun. 28, 1979, abandoned, which is a continuation of Ser. No. 883,104, Mar. 3, 1978, abandoned, which is a continuation of Ser. No. 553,397, Feb. 27, 1975, abandoned.

[51] Int. Cl.$^3$ .............................................. C10G 35/04
[52] U.S. Cl. ........................................ 208/66; 208/62
[58] Field of Search ...................................... 208/62, 66

[56] References Cited

U.S. PATENT DOCUMENTS 3,617,492  11/1971  Lorenz et al. ..................... 208/66
3,849,290  11/1974  Wise et al. ........................ 208/66

*Primary Examiner*—Curtis R. Davis
*Attorney, Agent, or Firm*—C. A. Huggett; C. J. Speciale; G. W. Allen

[57] ABSTRACT

Conventional noble metal reforming to upgrade the octane number of petroleum naphtha is an endothermic reaction which is carried out in a series of reactors with intermediate furnace heating of the petroleum fraction being upgraded. This specification discloses a process and apparatus configuration to increase the octane number of the reformate at a minimum liquid yield loss by cooling the first reforming stage effluent and then contacting the cooled effluent with a ZSM-5 type zeolite catalyst prior to the first intermediate furnace heating.

8 Claims, No Drawings

NOBLE METAL REFORMING OF NAPHTHA

CROSS-REFERENCE TO RELATED APPLICATIONS

This application is a continuation-in-part of application Ser. No. 53,582, filed June 28, 1979, now abandoned, which is in turn a continuation of application Ser. No. 883,104, filed Mar. 3, 1978, now abandoned, which is in turn a continuation of application Ser. No. 553,397, filed Feb. 27, 1975, now abandoned.

BACKGROUND OF THE INVENTION

1. Field of the Invention

This invention relates to upgrading petroleum naphtha. It more particularly refers to a modified reforming process for more efficiently increasing the octane number of the produced reformate at a smaller yield loss as compared to conventional reforming.

2. Description of the Prior Art

The reforming of petroleum naphthas in order to increase their octane number is one of the most important and widely practiced unit processes in the petroleum industry. Reforming catalysts are usually noble metals, such as platinum, or mixtures of metals, on acidic supports such as alumina. The acidity of reforming catalysts is often improved by chloriding them and/or by incorporating zeolites with them. The term reforming is used in the petroleum industry to embrace a number of hydrocarbon transformations which occur more or less simultaneously or sequentially including: dehydrogenation of naphthenes to aromatics, isomerization of aliphatics and aromatics, and dehydrocyclization of aliphatics. These reactions are cumulatively endothermic and, therefore, it is conventional to carry out reforming in a multiple series of reactors with initial and interstage heating. Thus, the initial naphtha feed is heated to a suitable reforming temperature of at least about 900° F. pressurized with hydrogen to some suitable pressure of at least about 150 psig and fed into contact with reforming catalyst in a first stage reactor. Passage of the charge through the reactor converts portions of it, according to at least some of the reaction mechanisms listed above, to an intermediate product having a lower temperature below about 825° F., a higher aromatics content and an associated higher octane. This intermediate improved product is then, in its entirety, heated in a furnace to a suitable temperature of at least about 900° F. and then passed through a second stage reactor containing reforming catalyst in which the above-recited reactions or some of them go forward endothermically to produce a further improved, intermediate product having a lower temperature, but not as low as the first stage reactor and a higher aromatics content and, therefore, a higher octane number. A third, and perhaps even a fourth, stage reactor with intermediate heating is conventionally employed to produce a final reformate of substantially higher octane than the feed naphtha. As reforming proceeds, the octane number of the liquid increases and the volume thereof decreases. Reforming with a given catalyst and at a given severity has a characteristic yield-octane relationship such that as the octane of the reformate is pushed higher, the volume thereof decreases. This yield-octane relationship is not a straight line function but is progressive in the sense that as the absolute octane is increased, the incremental octane improvement is achieved at the expense of proportionally increasing yield loss. That is, there is a greater yield loss in going from 95 to 96 octane than there is in going from 88 to 89.

In the recent past, there was impetus to improve the efficiency of naphtha octane upgrading, including a reforming process, by obtaining the final incremental octane boosts by processes other than noble metal reforming as described above. Thus, various processes have been proposed for upgrading reformate by shape selectivety cracking out the very low octane components using an erionite or a ZSM-5 type zeolite catalyst. Processes have also been proposed for combinations of shape selective cracking of the lowest octane components of reformate coupled with alkylation of aromatics in the reformate by at least some of the cracked fragments. Other proposals have suggested combination configurations whereby the naphtha was first subjected to shape selective cracking of the lowest octane components, followed by reforming, followed by another shape selective cracking operation. Another proposal has been to upgrade reformate by sequential shape selective cracking of the lowest octane components with respectively an erionite type and a ZSM-5 type catalyst.

While all of these processes have been more or less successful in increasing the reformate octane number at some yield sacrifice smaller than that which would have been necessary by increased severity reforming to the same octane level, all of them suffer from one or more associated disadvantages such as the problem of adjusting the temperature of the reformate product to that required to support shape selective cracking of the lowest octane components of the reformate.

Of particular importance is U.S. Pat. No. 3,729,409, Chen, which discloses the generic combination of reforming and reformate upgrading over a ZSM-5 zeolite catalyst.

It is, therefore, an object of this invention to provide a novel process configuration for upgrading the octane number of naphthas.

It is another object of this invention to provide a novel modified reforming process.

It is a further object of this invention to upgrade the octane number of naphthas at a reduced yield loss.

Other and additional objects of this invention will become apparent from a consideration of this entire specification including the claims hereof.

SUMMARY OF THE INVENTION

In accord with and fulfilling the objects of this invention, one aspect of this invention resides in a process comprising a particular combination of multi-stage reforming coupled with intermediate upgrading of the intermediate reformate with a highly active shape selective zeolite catalyst.

As was noted above, as naphtha passes through each reforming stage, the endothermic reactions taking place lower its temperature requiring intermediate heating. The space velocity and catalyst loading in each stage is, in fact, to some extent controlled by this endothermicity. Since reforming catalyst is not particularly active at temperatures below about 800° F., each of the reactors is designed to operate to an exit temperature of about this level or slightly above. The reactions taking place in the first reforming stage seem to be the most endothermic therefore limiting the catalyst loading in this reactor to a smaller amount than in the other reforming stages. Because of the catalyst activity and the reaction endothermicity referred to above, it is inappropriate to increase reformate octane levels by increasing the quantity of reforming catalyst in the first reactor.

According to this invention, however, a higher activity shape selective zeolite can and is provided at the downstream end of the first reforming stage. This catalyst bed is capable of performing its conversion function at the lower temperature existent in the fluid after passing through the first reforming stage or even lower. In fact, it is preferred to provide for cooling the first stage reformer effluent prior to contacting such with the zeolite. It is preferred to cool the first stage reformer effluent prior to contacting with the zeolite to a temperature in the range of between about 550° F. and 725° F., and more preferably from between about 600° F. and 675° F. It is important to note that there is remarkably good parametric interfacing between these two catalyst beds at this point in reforming. There is also remarkably good interfacing in terms of fluid composition into and out of this zeolite bed. One of the most important features of this interfacing is that the first stage reformate may be directly shape selectively converted over the zeolite without any product separation, heating, pressurizing or depressurizing. Further, the product resulting from this intermediate shape selective conversion goes right on through the remainder of conventional reforming with no substantial change in that operation and no intermediate product separation.

The shape selective zeolite conversion catalyst is suitably one which operates substantially only on normal paraffins and mono methyl substituted paraffins. Those zeolites which admit normal and mono methyl substituted paraffins are generally characterized as having pore diameters of about 7.5 Angstroms. These may be more or less eliptical. They are exemplified by ZSM-5, ZSM-11, ZSM-35 and ZSM-38 (disclosed respectively in U.S. Pat. Nos. 3,702,886; 3,709,979; 4,016,245; and 4,046,859). The shape selective zeolite is preferably one of high silica to alumina ratio for increased stability, e.g. at least about 15, preferably at least about 30. The zeolite may, if desired, be admixed with conventional noble metal reforming catalyst which, in this mixture, acts as an isomerization catalyst. The preferred zeolite is a ZSM-5 having a silica to alumina ratio of at least about 70.

The inherent, non-imposed operating conditions in this bed of shape selective zeolites are temperatures of about 600° to 900° F., space velocities of about 1.0 to 20.0 LHSV and pressure of about 100 to 600 psig. Operating in this manner gives a final reformate product having an increased octane of about 0.5 to 2 numbers over what would have been achieved by operating the same reformer stages in the same way alone. This is achieved with substantially no capital investment except for the shape selective catalyst itself. There may also, under some operating conditions and choice of catalyst, be an increased propane make at the expense of other light gases, which is desirable.

DESCRIPTION OF PREFERRED EMBODIMENTS

The following examples are illustrative of the practice of this invention without being limiting on the scope thereof. Parts and percentages are by weight unless specifically stated to be on some other basis.

EXAMPLES 1–3

A $C_6$-330° F. ⅓ volume ratio mixture of Nigerian and Arabian light naphtha was upgraded alternatively by reforming alone and by reforming coupled with intermediate shape selective zeolite treatment. The reforming catalyst was commercial chlorided platinum on alumina. The shape selective catalyst was HZSM-5 having a silica to alumina ratio of 140 to 1. Inlet temperature to each reforming stage was 950° F. and space velocity with respect to the reforming catalyst was 2.0 LHSV. Pressure was 350 psig and the recycle ratio was 12. The following table reports data obtained from side by side fully comparable runs. Example 1 reports a multi-stage reforming only mode of operation. Example 2 reports the same multi-stage reforming mode modified by the inclusion of shape selective zeolite conversion catalyst intermediate, the first and second reforming stages. Example 3 shows an operation similar to Example 2 except that internal cooling was applied to the first stage reformer effluent to adjust its temperature as noted.

TABLE

| Example No. | 1 | 2 | 3 |
|---|---|---|---|
| ZSM-5 catalyst bed inlet temperature (°F.) | — | 880 | 650 |
| Yields based on feed (wt.%) | | | |
| $H_2$ | 1.3 | 1.1 | 1.3 |
| $C_1$ | 1.9 | 2.1 | 1.9 |
| $C_2$ | 3.6 | 5.1 | 3.6 |
| $C_3$ | 5.9 | 9.6 | 6.5 |
| i-$C_4$ | 3.1 | 3.8 | 3.4 |
| n-$C_4$ | 4.2 | 5.3 | 4.5 |
| i-$C_5$ | 5.3 | 5.5 | 5.6 |
| n-$C_5$ | 3.9 | 4.2 | 4.1 |
| $C_6^+$ | 70.8 | 63.3 | 69.1 |
| Octane Nos. (Research) | | | |
| $C_5^+$ (R + 3) | 100.5 | 102.0 | 101.3 |
| $C_6^+$ (R + 3) | 101.5 | 103.7 | 102.6 |
| $C_5^+$ (R + 0) | 94.6 | 96.1 | 94.6 |
| $C_6^+$ (R + 0) | 96.7 | 99.0 | 97.0 |

By way of further comparison, when this same feed is processed by multi-stage reforming as set forth in Example 1, and then subjected to shape selective zeolite catalyst upgrading at the high temperature of Example 2, the product, while very good, is less desirable than that obtained with inter-stage shape selective upgrading.

Apparently, at this higher temperature, the zeolite is more capable of selectively cracking high carbon than is the reforming catalyst capable of non-selectively cracking and also dehydrocyclizing these same paraffins as compared to the relative performance of these two types of catalyst on the paraffins which seem to be present in the effluent of the last reactor.

What is claimed is:

1. In the process of increasing the octane number of naphthas by multi-stage endothermic reforming with a conventional noble metal reforming catalyst utilizing at least three reforming stages in series and including heating said naphtha intermediately between said stages; the improvement; whereby increasing the octane number of said naphtha more efficiently; improving yield and reducing catalyst aging, which comprises: cooling the effluent of said first reforming stage to a temperature in the range of between about 550° F. and 725° F., contacting said cooled effluent with a zeolite catalyst having a silica to alumina ratio of at least about 15 and selected from the group consisting of ZSM-5, ZSM-11, ZSM-35 and ZSM-38; heating the effluent after said contacting and then feeding such heated effluent to the second stage of said reforming process.

2. The improved process claimed in claim 1 wherein said zeolite is ZSM-5.

3. The improved process claimed in claim 1 wherein said zeolite is mixed with reforming catalyst.

4. The improved process claimed in claim 1 wherein the effluent of said first reforming stage is cooled to a temperature in the range of between about 600° F. and 675° F.

5. The improved process claimed in claim 4 wherein said temperature is 650° F.

6. The improved process claimed in claim 1 wherein said silica to alumina ratio is at least 30.

7. The improved process claimed in claim 1 wherein said zeolite is ZSM-5 having a silica to alumina mole ratio of at least about 70.

8. The improved process claimed in claim 1 wherein said zeolite is HZSM-5 having a silica to alumina mole ratio of 140 to 1.

* * * * *